United States Patent
Hammer et al.

(10) Patent No.: US 12,397,617 B2
(45) Date of Patent: Aug. 26, 2025

(54) REFRIGERATION SYSTEM HAVING A HEAT PUMP FUNCTION FOR A MOTOR VEHICLE, HAVING A SINGLE SENSOR DEVICE ON THE LOW-PRESSURE SIDE

(71) Applicant: AUDI AG, Ingolstadt (DE)

(72) Inventors: Hans Hammer, Pfaffenhofen (DE); Christian Rebinger, Munich (DE); Dirk Schroeder, Manching (DE)

(73) Assignee: AUDI AG, Ingolstadt (DE)

(*) Notice: Subject to any disclaimer, the term of this patent is extended or adjusted under 35 U.S.C. 154(b) by 149 days.

(21) Appl. No.: 18/042,821

(22) PCT Filed: Nov. 10, 2021

(86) PCT No.: PCT/EP2021/081189
§ 371 (c)(1),
(2) Date: Feb. 24, 2023

(87) PCT Pub. No.: WO2022/106272
PCT Pub. Date: May 27, 2022

(65) Prior Publication Data
US 2023/0322045 A1    Oct. 12, 2023

(30) Foreign Application Priority Data
Nov. 23, 2020 (DE) .......................... 102020130912.0

(51) Int. Cl.
*B60H 1/00* (2006.01)
*B60H 1/32* (2006.01)

(52) U.S. Cl.
CPC ....... *B60H 1/00899* (2013.01); *B60H 1/3229* (2013.01); *B60H 2001/3236* (2013.01)

(58) Field of Classification Search
CPC .............. B60H 1/00899; B60H 1/3229; B60H 2001/3236; B60H 1/00885;
(Continued)

(56) References Cited

U.S. PATENT DOCUMENTS 9,517,680 B2    12/2016   Sukuki et al.
2012/0085114 A1*  4/2012  Graaf .................... B60H 1/323
                                                    62/238.7
(Continued)

FOREIGN PATENT DOCUMENTS

| CN | 103649650 A | 3/2014 |
| CN | 111225810 A | 6/2020 |
| DE | 102015007564 A1 | 12/2016 |
| DE | 102015010552 B3 | 1/2017 |

(Continued)

OTHER PUBLICATIONS

International Search Report and Written Opinion issued on Feb. 28, 2022, in corresponding International Application No. PCT/EP2021/081189, 17 pages.

(Continued)

*Primary Examiner* — Kun Kai Ma
(74) *Attorney, Agent, or Firm* — Maier & Maier, PLLC

(57) ABSTRACT

A refrigeration system having a heat pump function for a motor vehicle. The refrigeration system includes: a refrigerant compressor which is connectable or connected to a primary line; a directly or indirectly acting external heat exchanger, which is arranged in the primary line; a first evaporator, which is arranged in the primary line; a first directly or indirectly acting heat exchanger, in particular a chiller, which is arranged fluidically in parallel to the evaporator; and a refrigerant collector arranged on the low-pressure side. A single sensor device is arranged downstream of the evaporator and the further heat exchanger, in particular the chiller, which is configured to detect the pressure and the temperature of the refrigerant on the low-pressure side of the refrigeration system.

15 Claims, 2 Drawing Sheets

(58) Field of Classification Search
CPC ........... B60H 2001/00949; B60H 2001/00957;
B60H 2001/325; B60H 2001/3252; B60H
1/00907; B60H 1/00921; F25B 13/00;
F25B 41/20; F25B 25/005; F25B 40/00;
F25B 2313/003; F25B 2313/02791; F25B
2600/2501; F25B 2600/2519; F25B
2700/1931; F25B 2700/1933; F25B
2700/21151; F25B 2700/21152; F25B
5/02

See application file for complete search history.

(56) References Cited

U.S. PATENT DOCUMENTS

| | | | | |
|---|---|---|---|---|
| 2014/0075966 A1* | 3/2014 | Schmitz | ............ | B60H 1/00921 165/42 |
| 2014/0075972 A1* | 3/2014 | Heyl | ................. | B60H 1/00507 62/324.1 |

FOREIGN PATENT DOCUMENTS

| | | | | |
|---|---|---|---|---|
| DE | 102016007490 A1 | 12/2017 | | |
| DE | 102017218424 A1 * | 4/2019 | ............... | B60H 1/00 |
| DE | 102018201165 B3 | 5/2019 | | |
| DE | 102018201945 A1 | 8/2019 | | |
| DE | 102018209769 A1 | 12/2019 | | |
| DE | 102018213232 A1 | 2/2020 | | |
| DE | 102019201428 A1 | 8/2020 | | |
| DE | 102019203292 A1 | 9/2020 | | |
| DE | 102019135056 A1 | 6/2021 | | |
| WO | 2013132046 A1 | 9/2013 | | |

OTHER PUBLICATIONS

International Preliminary Report on Patentability issued on May 16, 2023, in corresponding International Application No. PCT/EP2021/081189, 14 pages.

Examination Report issued on Jun. 10, 2021, in corresponding German Application No. 102020130912.0, 14 pages.

* cited by examiner

REFRIGERATION SYSTEM HAVING A HEAT PUMP FUNCTION FOR A MOTOR VEHICLE, HAVING A SINGLE SENSOR DEVICE ON THE LOW-PRESSURE SIDE

FIELD

The invention relates to a refrigeration system, in particular having a heat pump function, for a motor vehicle, wherein the refrigeration system comprises: a refrigerant compressor which is connectable or connected to a primary line; a directly or indirectly acting external heat exchanger, which is arranged in the primary line; a first evaporator, which is arranged in the primary line; a first directly or indirectly acting heat exchanger, in particular a chiller, which is arranged fluidically in parallel to the evaporator; and a refrigerant collector arranged on the low-pressure side.

BACKGROUND

According to DE 10 2018 201 165 B3, refrigeration systems having a refrigerant collector on the low-pressure side, which use both direct waste heat from electrical (drive) components via the additional heat exchanger, in particular a chiller, and ambient heat via an external heat exchanger, are provided with pressure/temperature sensors at various points in the refrigerant circuit. In particular, two or more sensor devices for detecting pressure and/or temperature are regularly provided on the low-pressure side of the refrigeration system. Further refrigeration systems are known from DE 10 2015 007 564 A1, subsequently published DE 10 2019 135 056, DE 10 2018 201 945 A1, and DE 10 2018 213 232 A1. In this case, in particular on the low-pressure side, a pressure/temperature sensor is arranged in each case after the evaporator or after the additional heat exchanger (chiller) and after the refrigerant collector.

SUMMARY

The object on which the invention is based is considered that of specifying a refrigeration system in which a simplified structure is achieved with essentially the same functionality.

A refrigeration system is thus proposed, in particular having an optional heat pump function, for a motor vehicle, wherein the refrigeration system comprises: a refrigerant compressor which is connectable or connected to a primary line; a directly or indirectly acting external heat exchanger, which is arranged in the primary line; a first evaporator, which is arranged in the primary line; a first directly or indirectly acting heat exchanger, in particular a chiller, which is arranged fluidically in parallel to the evaporator; and a refrigerant collector arranged on the low-pressure side. It is provided that a single sensor device is arranged downstream of the evaporator and the further heat exchanger, in particular the chiller, which is configured to detect the pressure and the temperature of the refrigerant on the low-pressure side of the refrigeration system.

By arranging a single sensor device for detecting pressure and temperature, one sensor device can be dispensed with in comparison to the known refrigeration systems, which simplifies the structure of the refrigeration system. It is to be noted that the single sensor device can have a single pressure sensor and a single temperature sensor or can be designed as a combined pressure/temperature sensor.

In the refrigeration system, the single sensor device can be arranged between the refrigerant collector and the refrigerant compressor. In other words, the single sensor device can be arranged downstream of the refrigerant collector. Compared to the known refrigeration systems, the position of the single sensor device after the refrigerant collector is retained, wherein the pressure/temperature sensor after the evaporator or chiller is simply dispensed with.

Alternatively, the single sensor device can be arranged upstream of the refrigerant collector in the refrigeration system. In other words, the single sensor device is arranged before the refrigerant collector, in particular shortly or directly before the refrigerant collector. In this context, immediately before the refrigerant collector can be understood to mean a distance that extends up to approximately 20 centimeters upstream of the refrigerant collector.

In both alternatives, the single sensor device can be arranged downstream of a branch in which an outlet-side line section of the evaporator and an outlet-side line section of the further heat exchanger, in particular a chiller, are connected to one another. In other words, the single sensor device is arranged after the refrigerant lines of the evaporator and the chiller have been combined.

The refrigeration system can have a control device that is configured to carry out at least one of the following functions based on detected pressure and/or temperature values from the single sensor device: monitoring temporary overheating of the refrigerant, in particular occurring for a short or long time, to identify underfilling; monitoring the minimum suction pressure for anti-icing protection. Brief overheating with accompanying underfilling, which usually lasts only a few seconds, is generally not critical for the operation of the refrigeration system, whereas long-term overheating with accompanying underfilling of at least one to several minutes is disadvantageous and critical for the operation of the refrigeration system.

An overheating condition in particular can be taken into consideration in the monitoring and, if necessary, timely compensation or the subsiding of the temporary underfilling. Such an overheating condition can occur, for example, in the event of
 load changes in the system towards a higher power requirement;
 low load when the evaporator is operated alone in cooling operation (AC operation);
 a heat pump operation, or in the event of
 a post-heating operation (reheat) with excess heat.

With the arrangement of the single sensor device downstream of the refrigerant collector, due to the transition from stationary to at least temporarily dynamic (transient) operation of the refrigeration system in connection with the load change that has occurred and the release of additionally required refrigerant from the refrigerant collector that has not yet completely taken place into the circuit, a delay in relieving the overheating condition during regular system operation is to be taken into consideration. The process of supplying refrigerant from the collector into the active system or the circuit itself runs with a delay. The larger the load change, the more pronounced or longer is the period of time before regular, quasi-stationary operation with an essentially constant refrigerant mass flow is restored.

In the refrigeration system having the single sensor device on the low-pressure side upstream of the refrigerant collector, the control device can also be configured to carry out at least one of the following additional functions based on detected pressure and/or temperature values:
 regulating the evaporator and/or the additional heat exchanger, in particular a chiller, in an AC dual operation;

regulating the overheating of the evaporator if more cooling power is required at the additional heat exchanger, in particular the chiller;

regulating the overheating of the additional heat exchanger, in particular the chiller, if more cooling power is required at the evaporator.

If the single sensor device is arranged upstream of the refrigerant collector, the above-described functions with respect to overheating can be implemented without any significant delay. Accordingly, the monitoring and, if necessary, curtailment of temporary underfilling via the overheating condition can take place very quickly and precisely.

In the refrigeration system having the single sensor device on the low-pressure side upstream of the refrigerant collector, the control device can be configured to take into consideration at least one stored characteristic curve and/or at least one stored characteristic diagram, wherein the characteristic curve or the characteristic diagram comprises values for determining prevailing pressure positions, in particular a suction pressure curtailment, based on a pressure detected by the single sensor device and on a pressure loss contained in the characteristic curve or in the characteristic diagram, which occurs downstream of the single sensor device to the refrigerant compressor. The characteristic curve or the characteristic diagram is used in particular to achieve improved quality with regard to the determination or estimation of target variables that are set by the system. Efforts are taken here so that the required or current pressures are determined at all operating points of the refrigeration system and, if necessary, a low-pressure limit is estimated or predicted.

Furthermore, in the refrigeration system, the control device can be configured to recognize underfilling, in particular by means of the evaluated refrigerant condition, downstream of the refrigerant collector, wherein a delaying effect of the refrigerant collector is estimated or determined by means of a characteristic diagram and/or by means of functions. It is to be taken into consideration that recognizing underfilling is detected more directly and therefore more dynamically and possibly more sensitively using the sensor device arranged upstream of the refrigerant collector, so that the damping or delaying effect described due to the refrigerant collector is to be modeled to set a final refrigerant state in the refrigeration system by means of a characteristic diagram and/or functions. In a simplified variant, a characteristic curve can alternatively be used.

The refrigeration system can furthermore comprise: a secondary line connected or connectable to the refrigerant compressor; and another heat exchanger that represents a heat source and acts directly or indirectly, in particular a heating register, which is arranged in the secondary line.

The refrigeration system can furthermore comprise: a primary line valve arranged between the refrigerant compressor and the external heat exchanger; and a secondary line valve arranged between the refrigerant compressor and the additional heat exchanger, in particular a heating register, which represents a heat source.

A motor vehicle, in particular an at least partially electrically operated motor vehicle, can have an above-described refrigeration system. In an electric vehicle, the efficient operation of the refrigeration system can result in power savings, so that a greater range of the electric vehicle can be achieved as a result. In particular, essentially all operating states of the refrigeration system can also be monitored by the refrigeration system presented here using only a single sensor device on the low-pressure side for detecting pressure and temperature, as if the refrigeration system were to have at least two pressure/temperature sensors on the low-pressure side.

BRIEF DESCRIPTION OF THE FIGURES

Further advantages and details of the invention result from the following description of embodiments with reference to the figures. In the figures.

DETAILED DESCRIPTION

Figure 1:
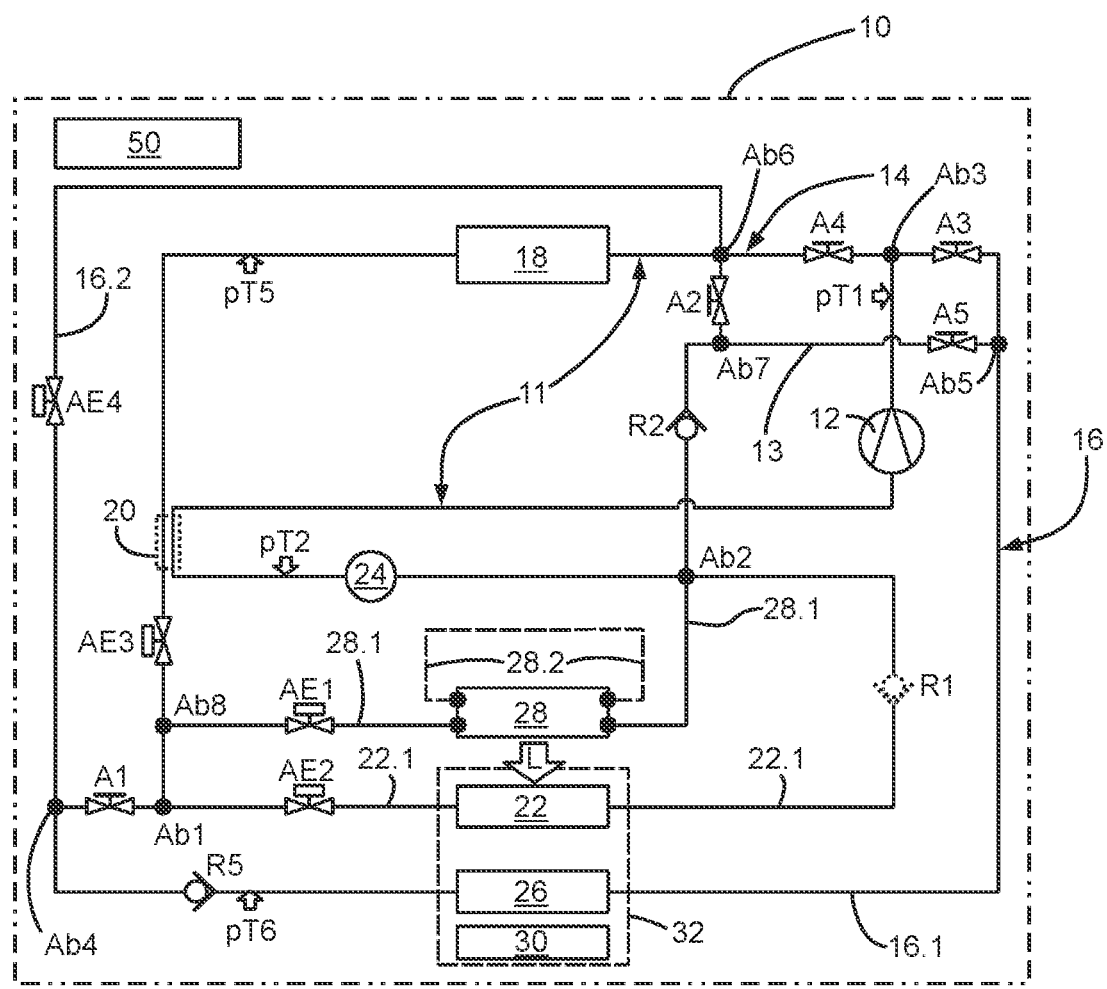
FIG. 1 shows a schematic and simplified circuit diagram of a refrigeration system for a motor vehicle.

FIG. 1 shows an embodiment of a refrigeration system 10 for a motor vehicle in a schematic and simplified manner. The refrigeration system 10 comprises a refrigerant circuit 11, which can be operated both in a refrigeration system operation (also called AC operation for short) and in a heat pump mode. In the embodiment shown, the refrigeration system 10 comprises a refrigerant compressor 12, an external heat exchanger 18, an internal heat exchanger 20, an evaporator 22 and an accumulator or refrigerant collector 24. The external heat exchanger 18 can be designed as a condenser or gas cooler. In particular, the external heat exchanger 18 can have flow through it in both directions in the illustrated embodiment.

The evaporator 22 is shown here by way of example as a front evaporator for a vehicle. The evaporator 22 is also representative of other evaporators possible in a vehicle, for example rear evaporators, which can be arranged fluidically in parallel to one another. In other words, the refrigeration system 10 comprises at least one evaporator 22.

A shut-off valve A4 is arranged downstream of the compressor 12. An expansion valve AE2 is provided upstream of the evaporator 22.

In the scope of this description, the section from the compressor 12 to the outer heat exchanger 18, to the inner heat exchanger 20, and to the evaporator 22 is referred to as the primary line 14 in the entire refrigerant circuit 11 of the refrigeration system 10.

The refrigeration system 10 furthermore comprises a heating register 26 (also referred to as a heating condenser or heating gas cooler). A shut-off valve A3 is arranged upstream of the heating register 26. A shut-off valve A1 is arranged downstream of the heating register 26. Furthermore, an expansion valve AE4 is arranged downstream of the heating register 26.

In the scope of this description, the section from the compressor 12 to the heating register 26, to the expansion valve AE4 and to a branch Ab2 is referred to as the secondary line 16 in the entire refrigerant circuit of the refrigeration system 10. The secondary line 16 comprises a heating branch 16.1, which extends from the shut-off valve A3 via the heating register 26 to the shut-off valve A1. The secondary line 16 also includes a reheating branch or reheat branch 16.2, which is fluidically connectable to the heating register 26 upstream and to the external heat exchanger 18 downstream. The secondary line 16 or the reheat branch 16.2 opens into the primary line 14 at a branching point Ab2.

The refrigeration system 10 comprises a further evaporator or chiller 28. The chiller 28 is provided fluidically in parallel to the evaporator 22. The chiller 28 can be used, for example, to cool an electrical component of the vehicle, but also to implement a water heat pump function using the waste heat from at least one electrical component. An expansion valve AE1 is connected upstream of the chiller 28.

The refrigeration system 10 can also have an electrical heating element 30, which is designed, for example, as a high-voltage PTC heating element. The electric heating element 30 is used as an auxiliary heater for a supply air flow L guided into the vehicle interior. The electric heating element 30 can be accommodated in an air conditioning unit 32 together with the heating register 26 and the evaporator 22. In this case, the electrical heating element 30 can be arranged downstream of the heating register 26.

Check valves R1 and R2 are also apparent in FIG. 1. Furthermore, several sensors pT1, pT5, pT6 on the high-pressure side for detecting pressure and/or temperature of the refrigerant are also shown. It is to be noted that the number of sensors on the high-pressure side and their arrangement is only shown here as an example. In the example shown, combined pressure/temperature sensors pT1, pT5, and pT6 are shown as the sensors. However, it is just as conceivable that sensors that are separate from one another are used for measuring pressure or temperature and, if necessary, are also arranged spatially separately from one another along the refrigerant lines.

The refrigeration system 10 can be operated in different modes, which are briefly described below.

In AC operation of the refrigerant circuit 11, the refrigerant compressed to high pressure flows from the refrigerant compressor 12 when the shut-off valve A4 is open into the outer heat exchanger 18. From there it flows to the high-pressure section of the internal heat exchanger 20 and the fully open expansion valve AE3. The refrigerant can flow to the expansion valve AE2 and into the interior evaporator 22 via a branching point Ab1 (evaporator section 22.1). In parallel or alternatively, the refrigerant can flow into the chiller 28 (chiller section 28.1) via a branching point Ab4 and the expansion valve AE1. From the evaporator 22 and/or the chiller 28, the refrigerant flows on the low-pressure side into the collector 24 and through the low-pressure section of the internal heat exchanger 20 back to the compressor 12.

In AC operation, the heating branch 16.1 or the secondary line 16 is shut off by means of the shut-off valve A3, so that hot refrigerant cannot flow through the heating register 26. To retrieve refrigerant from the inactive heating branch 16.1, the shut-off element A5, which is designed as a shut-off valve, can be opened so that the refrigerant can flow in the direction of the collector 24 via the shut-off element A5 and the check valve R2, with the shut-off element A2 being closed at the same time.

In heating operation of the refrigerant circuit 11, the shut-off valve A4 is closed and the shut-off valve A3 is open, so that hot refrigerant can flow into the heating branch 16.1.

To carry out the heating function by means of the chiller 28 to implement water heat pump operation, the refrigerant compressed by means of the refrigerant compressor 12 flows into the heating register 26 via the open shut-off valve A3. At the heating register 26, heat is given off to a supply air flow L guided into the vehicle interior. The refrigerant then flows via the open shut-off valve A1 and the branching point Ab1. It is expanded by means of the expansion valve AE1 in the chiller 28 to absorb waste heat from electrical and/or electronic components arranged in a coolant circuit 28.2. With this heating function, the expansion valves AE3 and AE4 are closed, the shut-off valve A5 is closed, and the shut-off valve A2 is open. In this case, refrigerant displaced in water heat pump operation can be extracted via the shut-off valve A2 out of a bidirectional line 14.1 or the primary line 14 and supplied to the collector 24 via the check valve R2.

To carry out the heating function by means of the external heat exchanger 18 as a heat pump evaporator, the refrigerant compressed by means of the refrigerant compressor 12 flows via the open shut-off valve A3 to give off heat to a supply air flow L into the heating register 26. It is then expanded via the open shut-off valve A1 by means of the expansion valve AE3 in the outer heat exchanger 18 to absorb heat from the ambient air. The refrigerant then flows via a heat pump return branch 15 to the collector 24 and back to the refrigerant compressor 12. The expansion valves AE1, AE2, and AE4 remain closed, as does the shut-off valve A5.

An indirect delta connection can be implemented in that when the shut-off valve A1 is open, the refrigerant compressed by the refrigerant compressor 12 is expanded by means of the expansion valve AE1 in the chiller 28, wherein no mass flow is generated at the same time on the coolant side, i.e., in the coolant circuit 28.2, thus, for example, the fluid used as the coolant, such as water or water-glycol mixture, remains on the coolant side of the chiller 28 or coolant does not actively flow through the chiller 28. The expansion valves AE2, AE3, and AE4 remain closed in this switching variant.

In a reheating or reheat operation, the supply air flow L supplied into the vehicle interior is first cooled by means of the evaporator 22 and thus dehumidified. Using the heat transferred to the refrigerant by evaporation and dehumidification and the heat supplied to the refrigerant via the compressor 12, the supply air flow L can be completely or at least partially reheated by means of the heating register 26.

For this purpose, the refrigeration system 10, in particular the air conditioning unit 32, has adjustable, in particular controllable and pivotable, temperature flaps 34 between the evaporator 22 and the heating register 26. In the example shown, a left and a right temperature flap 34L and 34R (shown schematically in FIG. 1) are arranged. The temperature flaps 34L, 34R can be adjusted or pivoted between an open position, designated as a 100% position, and a closed position, designated as a 0% position. Alternatively, it is also possible to connect the temperature flaps 34R, 34L downstream of the heating register 26.

In the 100% position, the entire supply air flow L flowing through the evaporator 22 is guided and heated via the heating register 26 before it can flow into the passenger compartment of the vehicle. In the 0% position the entire supply air flow L flowing through the evaporator 22 flows in the bypass around the heating register 26 without heating and thus without absorbing heat into the passenger compartment.

In an x position of the temperature flaps 34L and 34R with 0%<x<100%,
 these temperature flaps are only partially open, so that in each case only a
 partial air flow of the supply air flow L flowing through the evaporator 22 is guided via the heating register 26. This heated partial air flow can then be mixed with the remaining, cooled and dehumidified partial air flow. The supply air flow L heated in this way is supplied to the passenger compartment of the vehicle. As an example, a 50% position indicates that the temperature flaps 34R and 34L are only half open, i.e., 50%.

A single sensor device pT2 is arranged on the low-pressure side of the refrigeration system 10, in particular downstream of the evaporator 22 and downstream of the chiller 28. In the example in FIG. 1, the sensor device pT2 is arranged downstream of the refrigerant collector 24. In particular, the sensor device pT2 is provided between the refrigerant collector 24 and the internal heat exchanger 20.

The evaporator 22 and the chiller 28 have a respective section, arranged on the outlet side or downstream of the relevant evaporator section 22.1 or chiller section 28.1, respectively, which are connected to one another at the branch Ab2. The single sensor device pT2 on the low-pressure side is provided downstream of the branch Ab2. This ensures that the pressure and the temperature of the refrigerant can be detected on the low-pressure side, independently of whether refrigerant flows through the evaporator 22 or the chiller 28 alone or in combination. In other words, the single sensor device pT2 is arranged between the branch Ab2 and the internal heat exchanger 20 (if present) or the refrigerant compressor 12.

Figure 2:
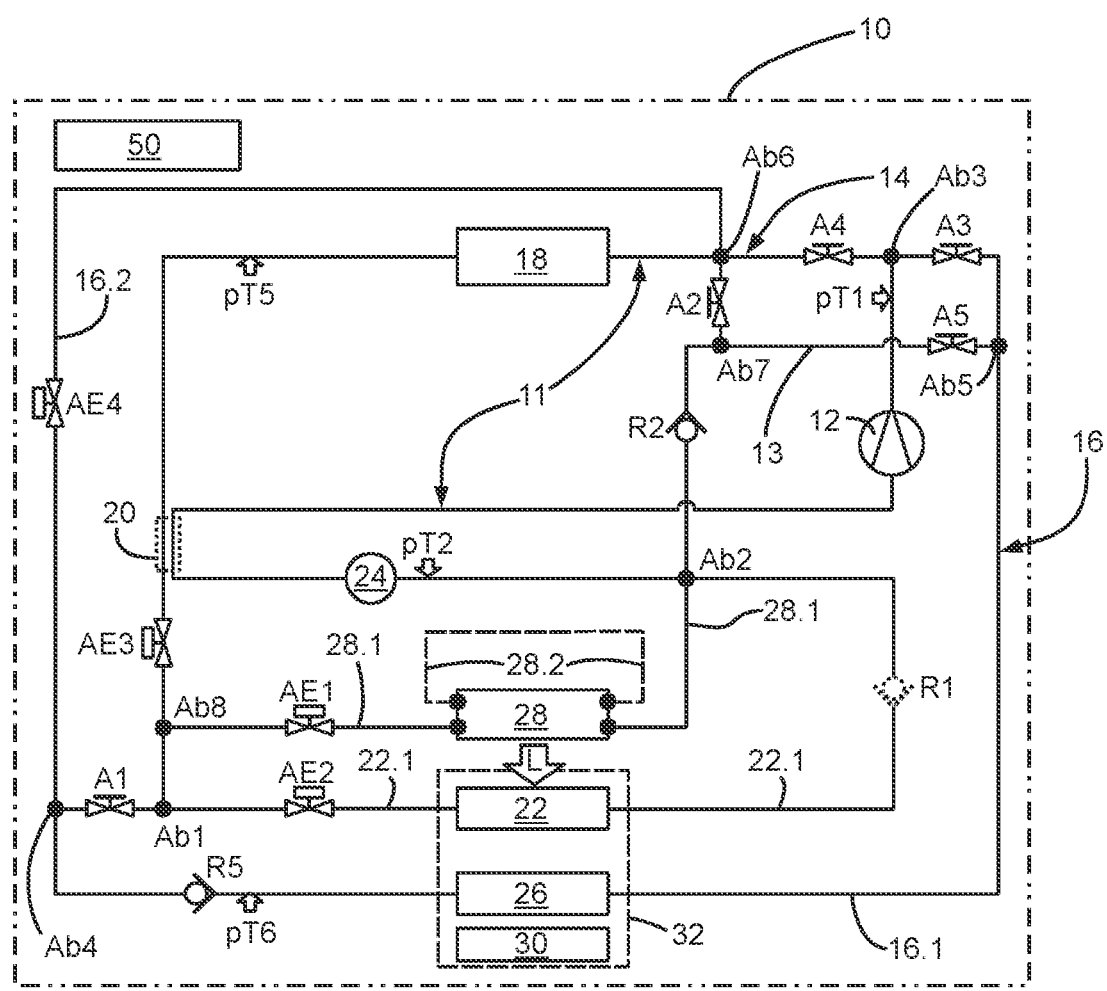
FIG. 2 shows a schematic and simplified circuit diagram of a refrigeration system for a motor vehicle.

FIG. 2 shows an alternative arrangement of the single low-pressure side sensor device pT2. In this case, the sensor device pT2 is arranged upstream of the refrigerant collector 24. In particular, the sensor device pT2 can be arranged directly before the refrigerant collector 24. A distance between the sensor device pT2 and the refrigerant collector can be up to 20 centimeters, for example.

The sensor device pT2 is also arranged downstream of the evaporator 22 and the chiller 28 in the example in FIG. 2. In particular, the sensor device pT2 is arranged downstream of the branch Ab2, where the evaporator section 22.1 and the chiller section 28.1 meet. In other words, the sensor device pT2 is arranged between the branch Ab2 and the coolant collector 24.

In both examples of FIGS. 1 and 2, the refrigeration system 10 has a control device 50 which is configured to detect the various operating states of the refrigeration system 10 that have been described above by way of example, but in particular to control or regulate them on the basis of the input values and setpoint variables. The control device 50 can in particular receive and process sensor data, calculate and/or estimate further operating parameters, and activate the refrigerant compressor or valve devices and the like of the refrigeration system.

In consideration of the structural design having a single low-pressure-side sensor device pT2, the control device 50 can be configured to perform at least one of the following functions based on recorded pressure and/or temperature values from the single low-pressure-side sensor device pT2: monitoring overheating, equivalent to systems having a refrigerant collector 24 arranged on the low-pressure side with underfilling, which in turn can occur either temporarily or permanently; and/or monitoring the minimum suction pressure for anti-icing protection.

In particular, an underfill condition can be taken into consideration when monitoring and, if necessary, curtailing the temporary overheating. Such an overheating and thus underfilling condition can occur, for example, in the event of
  load changes in the system towards a higher power requirement;
  low load when the evaporator is operated alone in cooling operation (AC operation);
  a heat pump operation, or
  a post-heating operation (reheat) with excess heat.

With the arrangement of the single sensor device pT2 downstream of the refrigerant collector 24 (FIG. 1), due to the transition from stationary to at least temporarily dynamic (transient) operation of the refrigeration system 10 in connection with the load change that has occurred and the release of additionally required refrigerant from the refrigerant collector 24 that has not yet completely taken place into the circuit, a delay in relieving the overheating condition during regular system operation is to be taken into consideration. The process of supplying refrigerant from the collector 24 into the active system or the circuit 11 itself runs with a delay. The larger the load change, the more pronounced or longer is the period of time before regular, quasi-stationary operation with an essentially constant refrigerant mass flow is restored.

In the refrigeration system 10 having the low pressure-side sensor device pT2 upstream of the refrigerant collector 24 (FIG. 2), the control device 50 can also be configured to carry out at least one of the following additional functions based on detected pressure and/or temperature values:
  regulating the evaporator 22 and/or the additional heat exchanger, in particular a chiller 28, in an AC dual operation;
  regulating the overheating of the evaporator 22 if more cooling power is required at the additional heat exchanger, in particular the chiller 28;
  regulating the overheating of the additional heat exchanger, in particular the chiller 28, if more cooling power is required at the evaporator 22.

If the single sensor device pT2 is arranged upstream of the refrigerant collector 24 (FIG. 2), the above-described functions with respect to overheating can be implemented without any significant delay. Accordingly, the monitoring and, if necessary, curtailment of temporary underfilling via the overheating state can take place very quickly and precisely. In the extreme case, which corresponds, for example, to permanently occurring overheating, which is measured, for example, at greater than 5 K, and unsuccessful regulator intervention to eliminate this normal operating deviation, the result is that the refrigeration system 10 is switched off.

In the refrigeration system 10 having the single low-pressure-side sensor device pT2 upstream of the refrigerant collector 24 (FIG. 2), the control device 50 can be configured to take into consideration at least one stored characteristic diagram, wherein the characteristic diagram comprises values for determining a suction pressure regulation based on a pressure detected by the single sensor device and on a pressure loss contained in the characteristic diagram, which occurs downstream from the single sensor device pT2 to the refrigerant compressor 12.

Furthermore, in the refrigeration system 10, the control device 50 can be configured to recognize underfilling downstream of the refrigerant collector 24, wherein a delaying effect of the refrigerant collector 24 is estimated by means of a characteristic diagram and/or by means of functions. It is to be taken into consideration that recognizing underfilling is detected more directly and therefore more dynamically and possibly more sensitively by the sensor device pT2 (FIG. 2) arranged upstream of the refrigerant collector 24, so that the damping or delaying effect described due to the refrigerant collector 24 arranged downstream is to be modeled by means of a characteristic diagram and/or functions.

By means of the refrigeration system 10 presented here having a single low-pressure-side sensor device pT2, at least one pressure-temperature sensor can be saved compared to known configurations of refrigeration systems for motor vehicles, which has a positive effect on the costs, package requirements, and weight of such a refrigeration system. Furthermore, despite the use of a single low-pressure-side sensor device pT2, it is possible to represent all essential functions or to provide them by means of the control device 50 of the refrigeration system 10.

The invention claimed is:

1. A refrigeration system having heat pump function for a motor vehicle, comprising:
   a refrigerant compressor, which is connectable or connected to a primary line;
   a directly or indirectly acting external heat exchanger, which is arranged in the primary line;
   a first evaporator, which is arranged in the primary line;
   a first directly or indirectly acting heat exchanger, comprising a chiller, which is arranged fluidically parallel to the first evaporator;
   a refrigerant collector arranged on the low-pressure side, and
   a control device,
   wherein a single sensor device is arranged downstream of the first evaporator and the first directly or indirectly acting heat exchanger comprising the chiller, wherein the single sensor device is configured to detect the pressure and the temperature of the refrigerant on the low-pressure side of the refrigeration system, and
   wherein the control device is configured to obtain one or more detected pressure and/or temperature values from the single sensor device and is configured to perform one of:
   monitoring temporary, in particular short-term or long-term, overheating of the refrigerant for recognizing underfilling; and
   monitoring the minimum suction pressure for anti-icing protection.

2. The refrigeration system as claimed in claim 1, wherein the single sensor device is arranged between the refrigerant collector and the refrigerant compressor.

3. The refrigeration system as claimed in claim 1, wherein the single sensor device is arranged upstream of the refrigerant collector.

4. The refrigeration system as claimed in claim 2, wherein the single sensor device is arranged downstream of a branch, in which an outlet-side line section of the first evaporator and an outlet-side line section the first directly or indirectly acting heat exchanger are connected to one another.

5. The refrigeration system as claimed in claim 1, wherein the control device is configured to carry out at least one of the following further functions based on detected pressure and/or temperature values from the single sensor device arranged upstream of the refrigerant collector:
   regulating the first evaporator and/or the first directly or indirectly acting heat exchanger in an AC dual operation;
   regulating the overheating of the first evaporator if more cooling power is required at the first directly or indirectly acting heat exchanger;
   regulating the overheating of the first directly or indirectly acting heat exchanger if more cooling power is required at the evaporator.

6. The refrigeration system as claimed in claim 5, wherein the control device is configured to take input from at least one stored characteristic curve and/or at least one stored characteristic diagram, wherein the at least one stored characteristic curve or the at least one stored characteristic diagram comprises values for determining prevailing pressure levels, in particular a suction pressure curtailment, based on a pressure detected by the single sensor device and a pressure loss contained in the characteristic curve or in the characteristic diagram, which occurs downstream from the single sensor device to the refrigerant compressor.

7. The refrigeration system as claimed in claim 6, wherein the control device is furthermore configured to recognize underfilling downstream of the refrigerant collector, wherein a delaying effect of the refrigerant collector is estimated or determined based on at least one of: a characteristic diagram the monitoring functions.

8. The refrigeration system as claimed in claim 1, further comprising:
   a secondary line, which is connectable or connected to the refrigerant compressor; and
   a further directly or indirectly acting heat exchanger, representing a heat source, comprising a heating register, which is arranged in the secondary line.

9. The refrigeration system as claimed in claim 8, further comprising:
   a primary line valve arranged between the refrigerant compressor and the directly or indirectly acting external heat exchanger;
   a secondary line valve arranged between the refrigerant compressor and the further directly or indirectly acting heat exchanger.

10. A motor vehicle, comprising an at least partially electrically powered motor vehicle, having the refrigeration system as claimed in claim 1.

11. The refrigeration system as claimed in claim 3, wherein the single sensor device is arranged downstream of a branch, in which an outlet-side line section of the first evaporator and an outlet-side line section of the first directly or indirectly acting heat exchanger, are connected to one another.

12. The refrigeration system as claimed in claim 2, further comprising:
   a secondary line, which is connectable or connected to the refrigerant compressor; and
   a further directly or indirectly acting heat exchanger, representing a heat source comprising a heating register, which is arranged in the secondary line.

13. The refrigeration system as claimed in claim 3, further comprising:
   a secondary line, which is connectable or connected to the refrigerant compressor; and
   a further directly or indirectly acting heat exchanger, representing a heat source, comprising a heating register, which is arranged in the secondary line.

14. The refrigeration system as claimed in claim 4, further comprising:
   a secondary line, which is connectable or connected to the refrigerant compressor; and
   a further directly or indirectly acting heat exchanger, representing a heat source, comprising a heating register, which is arranged in the secondary line.

15. The refrigeration system as claimed in claim 5, further comprising:
   a secondary line, which is connectable or connected to the refrigerant compressor; and
   a further directly or indirectly acting heat exchanger, representing a heat source, comprising a heating register, which is arranged in the secondary line.

* * * * *